United States Patent
Desai et al.

(10) Patent No.: US 8,578,119 B2
(45) Date of Patent: Nov. 5, 2013

(54) FILE SYSTEM QUOTA AND RESERVATION

(75) Inventors: Samir Desai, Pune (IN); Shriram Wankhade, Pune (IN)

(73) Assignee: Symantec Corporation, Mountain View, CA (US)

(*) Notice: Subject to any disclaimer, the term of this patent is extended or adjusted under 35 U.S.C. 154(b) by 833 days.

(21) Appl. No.: 12/619,343

(22) Filed: Nov. 16, 2009

(65) Prior Publication Data

US 2011/0119461 A1 May 19, 2011

(51) Int. Cl.
*G06F 12/00* (2006.01)
(52) U.S. Cl.
USPC .................... 711/170; 711/113; 711/158
(58) Field of Classification Search
USPC ........................ 711/170, 113, 158
See application file for complete search history.

(56) References Cited

U.S. PATENT DOCUMENTS

| 6,032,216 A * | 2/2000 | Schmuck et al. ............ 710/200 |
| 6,832,248 B1 * | 12/2004 | Byrnes ........................ 709/223 |
| 8,024,516 B2 * | 9/2011 | Miura ........................... 711/113 |
| 2010/0106933 A1 * | 4/2010 | Kamila et al. ................ 711/171 |

* cited by examiner

*Primary Examiner* — Hashem Farrokh
(74) *Attorney, Agent, or Firm* — Wilmer Cutler Pickering Hale and Dorr LLP

(57) ABSTRACT

A method, in one embodiment, can include allowing storage allocation of data of a file system within an object based storage system. Furthermore, the method can include determining if storage allocation usage for the file system is below a threshold. If the storage allocation usage for the file system is not below the threshold, a client is requested to flush its dirty data associated with the file system. After requesting a client flush, the method can include determining the storage allocation usage for the file system. In addition, the method can include determining periodically if the storage allocation usage has reached a quota. If the quota is reached, the quota is enforced for the data of the file system.

20 Claims, 6 Drawing Sheets

FILE SYSTEM QUOTA AND RESERVATION

BACKGROUND

In a clustered storage environment, it is typical to thin provision the file systems and let file system clients use a common pool of storage. The storage itself is built by adding small units to the storage pool as and when needed. One such example of this type of system is the object based storage system. Here the storage nodes, each referred to as an Object Storage Device (OSD), can be pooled in order to build or accumulate large amounts of storage space. Typically, there are one or more meta-data servers which serve the namespace and perform the management and control operations of the object based storage system. In such a system, the file system clients interact with the meta-data server in order to look up the filename and get a mapping to the storage units, called objects. Note that the objects are served by the Object Storage Devices. In addition, the block level storage accounting is performed by the Object Storage Devices themselves, without fine-grained control by the meta-data server. The access grant provided to the file system clients by the meta-data server, along with the mapping, allows the file system clients to write to the objects, usually without restriction on how much space they can consume.

However, it can be desirable to impose space usage limits on one or more file systems of the object based storage system. For example, space usage limits for different file systems can ensure that each file system has enough corresponding storage space while restricting any file system from over consuming the available storage system. Nevertheless, the setup of the object based storage system makes it difficult for the meta-data server to impose limits on the space usage of one or more file systems. For example, within an Object Storage Device based system, usually there are tens or hundreds of Object Storage Devices on which a single file system data can span and reside, thus increasing the complexity of imposing limits on the space usage of that file system.

SUMMARY

A method, in one embodiment, can include allowing storage allocation of data of a file system within an object based storage system. Furthermore, the method can include determining if storage allocation usage for the file system is below a threshold. If the storage allocation usage for the file system is not below the threshold, a client is requested to flush its dirty data associated with the file system. After requesting a client flush, the method can include determining the storage allocation usage for the file system. In addition, the method can include determining periodically if the storage allocation usage has reached a quota. If the quota is reached, the quota is enforced for the data of the file system. In an embodiment, after the enforcing of the quota, the method can further include determining if the storage allocation usage for the file system is below the quota. In one embodiment, the enforcing includes stopping issuance of write tokens for the file system. In an embodiment, the enforcing includes setting a partition quota on a partition of the file system. It is noted that in one embodiment, the setting a partition quota on a partition includes setting the partition quota equal to the storage consumption of the partition. In an embodiment, the allowing of storage allocation further includes allowing storage allocation of data of the file system across a plurality of data servers within the object based storage system. In one embodiment, the quota can be a common quota for a plurality of file systems.

In another embodiment, a computer readable storage medium has stored thereon, computer-executable instructions that when executed by a computing device cause the computing device to perform a method. The method includes: allowing storage allocation of data of a file system within an object based storage system; determining if storage allocation usage for the file system is below a threshold; if the storage allocation usage for the file system is not below the threshold, requesting a client flush its dirty data associated with the file system; after the requesting a client flush, determining the storage allocation usage for the file system; determining periodically if the storage allocation usage has reached a quota; and if the quota is reached, enforcing the quota for the data of the file system. In one embodiment, after the enforcing of the quota, the method can further include determining if the storage allocation usage for the file system is below the quota. In an embodiment, the enforcing includes stopping issuance of write tokens for the file system. In an embodiment, the enforcing includes setting a partition quota on a partition of the file system. In one embodiment, the setting a partition quota on a partition includes setting the partition quota equal to the storage consumption of the partition. In an embodiment, the allowing storage allocation further includes allowing storage allocation of data of the file system across a plurality of data servers within the object based storage system. In one embodiment, the quota is a common quota for a plurality of file systems.

In yet another embodiment, a computer system includes a processor and computer readable storage media coupled to the processor and having stored therein instructions that, if executed by the computer system cause the computer system to execute a method. The method includes: allowing storage allocation of data of a file system within an object based storage system; determining if storage allocation usage for the file system is below a threshold; if the storage allocation usage for the file system is not below the threshold, requesting a client flush its dirty data associated with the file system; after the requesting a client flush, determining the storage allocation usage for the file system; determining periodically if the storage allocation usage has reached a quota; and if the quota is reached, enforcing the quota for the data of the file system. In one embodiment, after the enforcing of the quota, the method can further include determining if the storage allocation usage for the file system is below the quota. In an embodiment, the enforcing includes stopping issuance of write tokens for the file system. In an embodiment, the enforcing includes setting a partition quota on a partition of the file system. In an embodiment, the setting a partition quota on a partition includes setting the partition quota equal to the storage consumption of the partition. In one embodiment, the quota is a common quota for a plurality of file systems.

While particular embodiments in accordance with the invention have been specifically described within this Summary, it is noted that the invention and the claimed subject matter are not limited in any way by these embodiments.

BRIEF DESCRIPTION OF THE DRAWINGS

The accompanying drawings, which are incorporated in and form a part of this specification and in which like numerals depict like elements, are included for exemplary illustration of principles of the present embodiments and are not intended to limit the invention to the particular implementations illustrated therein. The drawings referred to in this description should not be understood as being drawn to scale except if specifically noted.

DETAILED DESCRIPTION

Figure 1:
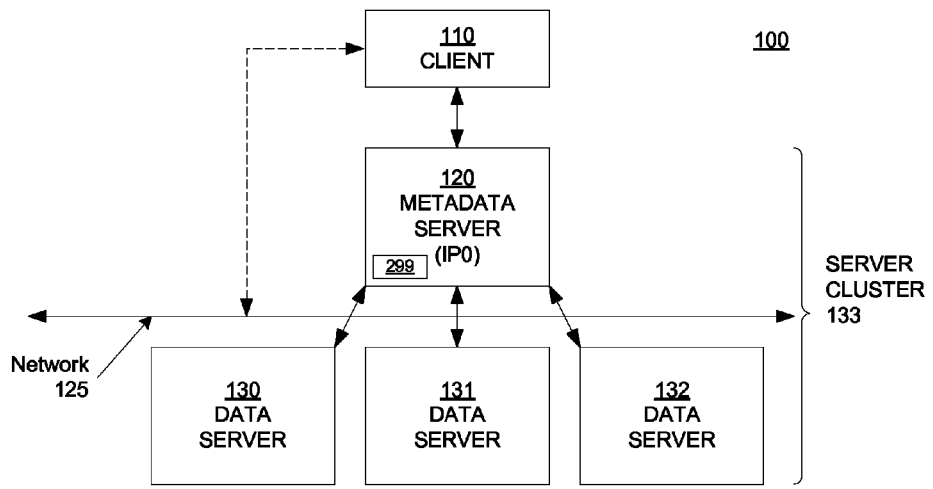
FIG. 1 is a block diagram depicting an example of a network upon which embodiments according to the present disclosure can be implemented.

Reference will now be made in detail to various embodiments in accordance with the invention, examples of which are illustrated in the accompanying drawings. While the invention will be described in conjunction with various embodiments, it will be understood that these various embodiments are not intended to limit the invention. On the contrary, the invention is intended to cover alternatives, modifications, and equivalents, which may be included within the scope of the invention as construed according to the appended Claims. Furthermore, in the following detailed description of various embodiments in accordance with the invention, numerous specific details are set forth in order to provide a thorough understanding of the invention. However, it will be evident to one of ordinary skill in the art that the invention may be practiced without these specific details. In other instances, well known methods, procedures, components, and circuits have not been described in detail as not to unnecessarily obscure aspects of the invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical or magnetic signals capable of being stored, transferred, combined, compared, and otherwise manipulated in a computer system or computing device. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "allowing," "determining," "enforcing," "requesting," "stopping," "accessing," "selecting," "sending," "monitoring," "setting," "instructing," "making a decision," or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

It is appreciated present systems and methods can be implemented in a variety of architectures and configurations. For example, present systems and methods can be implemented as part of a distributed computing environment, a cloud computing environment, a client server environment, etc. Embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular abstract data types. The functionality of the program modules may be combined or distributed as desired in various embodiments.

Computer storage media can include volatile and nonvolatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can be accessed to retrieve that information.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

FIG. 1 is a block diagram depicting a network 100 upon which embodiments of the present disclosure may be used. The network 100 may be referred to as, but is not limited to, a clustered storage system, cluster file system, network file system, or storage area network. In general, the network 100 is a network in which a set of computers (e.g., similar to computer system 210 of FIG. 3) can perform input/output (I/O) operations using, in one embodiment, an object-based file system that utilizes Internet Protocol (IP)-based storage and remote procedure calls (RPCs), but is not limited to such.

In the example of FIG. 1, the network 100 includes a meta-data server 120 (which may be referred to herein as a "server node") and data servers 130, 131, and 132. The data servers 130-132 may be referred to as Object Storage Devices (OSDs). The meta-data server 120 and the data servers 130-132 can communicate with each other via a communication network 125. It is noted that the communication network 125 can be implemented in a wide variety of ways. For example, the communication network 125 can include, but is not limited to, one or more wired technology networks, one or more wireless technology network, or any combination of wired and wireless technology networks. Within the network 100, note that there may be any number of meta-data servers (e.g., similar to meta-data server 120), any number of data servers (e.g., similar to data servers 130-132), and any number of clients (e.g., similar to client 110).

In an embodiment, a unique address can be associated with the meta-data server 120. In one embodiment, a server within the server cluster 133 may be designated as the access point through which communications between clients (e.g., 110) and the server cluster 133 are channeled. In an embodiment, the address is an IP address (e.g., IPO). A client 110 can be given an IP address, which it uses to contact the meta-data server (e.g., 120) to which it is assigned, either through the communication network 125 or more directly. In the example of FIG. 1, the IP address IPO for meta-data server 120 can be provided to the client 110.

Within FIG. 1, it is noted that the meta-data server 120 can include a quota and/or reservation module 299 in accordance with various embodiments of the present disclosure. For example in one embodiment, the module 299 can cause the meta-data server 120 to implement a file system quota (e.g., upper limit on storage space allocation to a file system) on one or more file systems of the network 100 when the meta-data server 120 (e.g., master node) is not in the data path. Furthermore, in an embodiment, the module 299 can cause the meta-data server 120 to implement a file system reservation which can include setting a common quota on files systems of the network 100 that do not have any set quota.

It is noted that the client 110 can access data stored in the data servers 130-132 via the meta-data server 120. Information about the data (e.g., meta-data) can be stored on or by the meta-data server 120. The meta-data server 120 can perform operations such as, but not limited to, looking up pathnames, retrieving file sizes, tracking access/update times, and checking permissions. Meta-data server 120 is, in general, a computer that runs server software that performs the above operations and that also can pass out tokens that allow access to the objects on the data servers 130-132 that contain file data.

In the example of FIG. 1, note that the data requested by the client 110 may span multiple objects and may be distributed across one or more of the data servers 130-132. In addition, the data may also be stored redundantly across multiple objects on one or more of the data servers 130-132.

In accordance with one embodiment, the meta-data server 120 and the data servers 130-132 present a full file system abstraction to the client 110. In other words, the architecture of the network 100 is, in general, transparent to the client 110.

Figure 2:
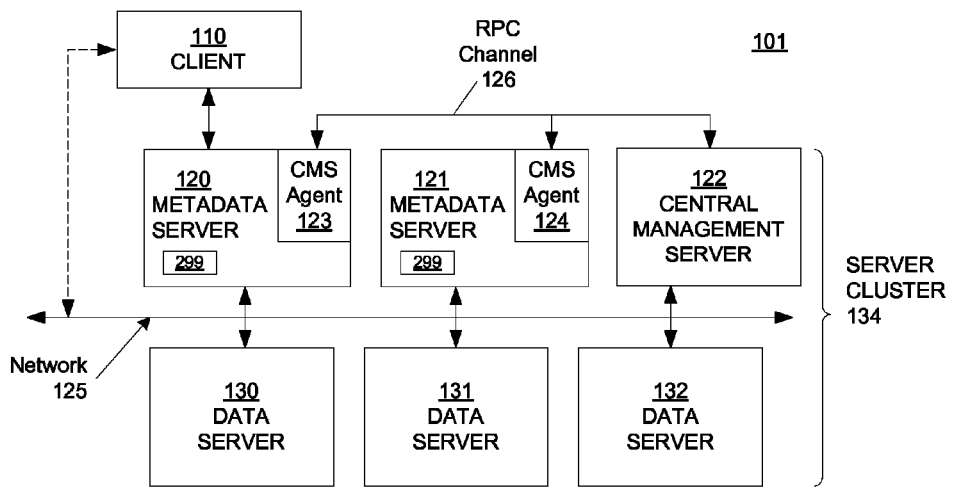
FIG. 2 is a block diagram depicting an example of a network including a central management server according to an embodiment of the present disclosure.

FIG. 2 is a block diagram depicting an example of a network 101 including a central management server (CMS) 122 according to an embodiment of the present disclosure. Network 101 of FIG. 2 can operate in a manner similar to network 100 of FIG. 1. However, it is noted that network 101 of FIG. 2 can be utilized to implement a file system reservation in accordance with various embodiments of the present disclosure. More specifically, network 101 can be utilized to implement a file system reservation across multiple meta-data servers in accordance with various embodiments. Note that in one embodiment, the central management server 122 can also serve as a meta-data server similar to the meta-data server 120. In addition, the role of the central management server 122 can be handled by a server other than a meta-data server.

Network 101 can include, but is not limited to, the meta-data servers 120 and 121, the central management server 122, and the data servers 130, 131, and 132. Note that a central management server agent (or daemon) can reside on each of the meta-data servers 120 and 121 of network 101. Specifically, a CMS agent or daemon 123 can reside on the meta-data server 120 and a CMS agent or daemon 124 can reside on the meta-data server 121. The meta-data servers 120 and 121, the central management server 122, and the data servers 130-132 can communicate with each other via the communication network 125. Furthermore, in an embodiment, another communication mechanism between the central management server 122 and the meta-data servers 120 and 121 can be a remote procedure call (RPC) channel 126. Specifically, the RPC channel 126 can exist between the central management server 122 and the CMS agent 123 of the meta-data server 120 and the CMS agent 124 of the meta-data server 121.

Within FIG. 2, in one embodiment, as file systems are mounted on the multiple meta-data servers 120 and 121, the central management server 122 can create a consolidated view of them in order to implement a file system reservation across the multiple meta-data servers 120 and 121. Note that while each of the meta-data servers 120 and 121 can take care of enforcing a file system quota (e.g., upper limit on storage space allocation to a file system) on its mounted file systems, the reservation related enforcement can be handled by each of the meta-data servers 120 and 121 on indication by the central management server 122.

In one embodiment, the central management server 122 starts a daemon which periodically (e.g., every 5 seconds, 10 seconds, or any time interval) monitors the space usage of all file systems by sending a RPC via the RPC channel 126 to the meta-data server (e.g., 120 or 121) which has mounted the specific file system. The central management server 122 gets the quota and reservation information from the CMS database. After doing calculations that will be described below, the central management server 122 can take appropriate action. In order to start or stop allocations for a file system, the central management server 122 sends an RPC to the appropriate meta-data server (e.g., 120 or 121). The meta-data server (e.g., 120 or 121) uses the local information before executing the action. For example, if the central management server 122 sends an RPC to STOP allocation for a file system and if the meta-data server (e.g., 120 or 121) has already done so for a quota reason, then the meta-data server will trivially succeed the request. Similarly, if the central management server 122 asks the meta-data server (e.g., 120 or 121) to START allocation for a file system, but if the file system has already approached its quota limit, then the meta-data server will not start allocation for this file system, but trivially succeed the RPC from the central management server 122.

Within FIG. 2, in one embodiment, the RPCs can include, but is not limited to, the central management server 122 sending a RPC to a CMS agent (e.g., 123 or 124) that request the space usage for a file system. In response, the CMS agent does a statvfs( ) on the file system (or does an ioctl) in order to get its current space usage. The CMS agent then returns that information to the central management server 122. Additionally, the central management server 122 can send a RPC to a CMS agent (e.g., 123 and 124) to enforce a stop allocation (e.g., STOP_ALLOC) for a file system. The CMS agent can call an ioctl whose handler uses the partition quota based mechanism to stop any new allocations for that file system. Moreover, the central management server 122 can send a RPC to a CMS agent (e.g., 123 and 124) to start allowing allocation (e.g., START_ALLOC) for a file system. The CMS agent can call an ioctl whose handler uses the partition quota based mechanism to start allowing allocations for that file system.

Figure 3:
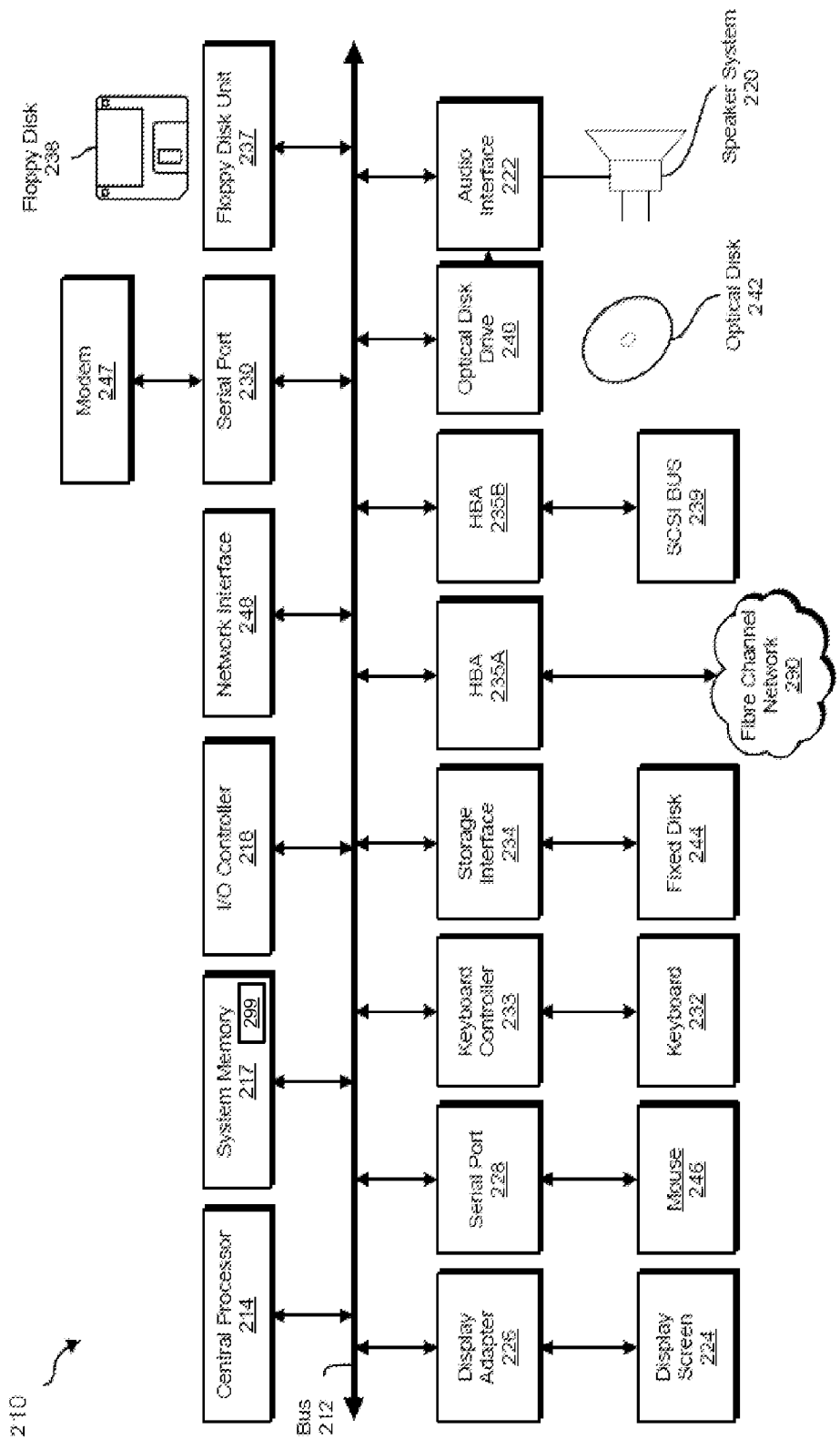
FIG. 3 is a block diagram depicting an example of a computer system upon which embodiments according to the present disclosure can be implemented.

FIG. 3 depicts a block diagram of a computer system 210 suitable for implementing embodiments of the present disclosure. In the discussion to follow, various and numerous components and elements are described. Various combinations and subsets of those components can be used to implement the devices mentioned in conjunction with FIGS. 1 and 2. For example, the client 110 may be a full-function computer system that employs many if not all of the features of the computer system 210. However, the meta-data servers 120-121, the central management server 122, and the data servers 130-132 may utilize a subset of those features needed to support the functionality provided by those devices. For example, the meta-data servers 120-121, the central management server 122, and the data servers 130-132 may not need a keyboard or display, and may execute a relatively sparse operating system that supports the functionality of data storage and data access and the management of such functionality.

In the example of FIG. 3, the computer system 210 includes a bus 212 which interconnects major subsystems of the computer system 210. These subsystems can include, but is not limited to, one or more central processors 214; a system memory 217; an input/output controller 218; an external audio device, such as a speaker system 220 via an audio output interface 222; an external device, such as a display screen 224 via display adapter 226; serial ports 228 and 230; a keyboard 232 (interfaced with a keyboard controller 233); a storage interface 234; a floppy disk drive 237 operative to receive a floppy disk 238; a host bus adapter (HBA) interface card 235A operative to connect with a Fibre Channel network 290; an HBA interface card 235B operative to connect to a Small Computer System Interface (SCSI) bus 239; and an optical disk drive 240 operative to receive an optical disk 242. Also included are a mouse 246 (or other point-and-click device, coupled to bus 212 via serial port 228); a modem 247 (coupled to bus 212 via serial port 230); and a network interface 248 (coupled directly to bus 212). The modem 247, network interface 248 or some other method can be used to provide connectivity from each of the nodes 110 and 120 to the network 100 of FIG. 1.

The bus 212 of FIG. 3 allows data communication between the central processor 214 and system memory 217, which may include non-volatile memory (e.g., read only memory (ROM), programmable ROM, flash memory, electrically erasable programmable read only memory (EEPROM), and the like) or volatile memory (e.g., random access memory (RAM), static RAM, dynamic RAM, and the like) or some combination of non-volatile memory and volatile memory. The volatile memory is generally the main memory into which the operating system and application programs are loaded. The non-volatile memory can contain, among other code, the Basic Input-Output System (BIOS) which controls basic hardware operation such as the interaction with peripheral components.

Applications resident within the computer system 210 are generally stored on and accessed via a computer-readable storage medium, such as a hard disk drive (e.g., the fixed disk 244), an optical drive (e.g., the optical drive 240), a floppy disk unit 237, or other storage medium. Applications can be in the form of electronic signals modulated in accordance with the application and data communication technology when accessed via network modem 247 or interface 248.

Continuing with reference to FIG. 3, storage interface 234, as with the other storage interfaces of computer system 210, can connect to a standard computer-readable storage medium for storage and/or retrieval of information, such as a fixed disk drive 244. The fixed disk drive 244 may be a part of the computer system 210, or it may be separate and accessed through other interface systems. The modem 247 may provide a direct connection to a remote server via a telephone link or to the Internet via an internet service provider (ISP). The network interface 248 may provide a direct connection to a remote server via a direct network link to the Internet via a POP (point of presence). The network interface 248 may provide such a connection using wireless techniques, including digital cellular telephone connection, Cellular Digital Packet Data (CDPD) connection, digital satellite data connection, or the like.

Many other devices or subsystems (not shown in FIG. 3) may be connected to the computer system 210 in a similar manner (e.g., document scanners, digital cameras, and the like). Conversely, all of the devices shown in FIG. 3 need not be present to practice the present disclosure. In addition, it is noted that the devices and subsystems of the computer system 210 can be interconnected in different ways from that shown in FIG. 3.

The operation of a computer system such as that shown in FIG. 3 is readily known in the art and is not discussed in detail in this application. The operating system provided on the computer system 210 may be MS-DOS®, MS-WINDOWS®, OS/2®, UNIX®, Linux®, or another known operating system. Code to implement the present disclosure can be stored in computer-readable storage media such as one or more of the system memory 217, fixed disk 244, optical disk 242, or floppy disk 238. For example, the system memory 217 is shown storing a module 299 in accordance with various embodiments of the present disclosure. However, the module 299 can also be stored in computer-readable storage media such as one or more of the system memory 217, fixed disk 244, optical disk 242, or floppy disk 238. It should further be noted, that in an embodiment, the computer system 210 can have some, most, or all of its functionality supplanted by a distributed computer system having a large number of dispersed computing nodes, as would be the case where the functionality of the computer system 210 is partly or wholly executed using a cloud computing environment.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

With reference to FIG. 1, in one embodiment, the meta-data server 120 can monitor the space usage of one or more file systems that store data on one or more of the data servers 130-132. Specifically, the module 299 can cause the meta-data server 120 to monitor the space usage of the one or more file systems. For example, while the space usage of a file system is below a pre-defined lower threshold, the module 299 allows unrestricted space allocations by the one or more file systems. However, as the space usage of that file system reaches above the lower threshold, the clients (e.g., 110) are requested by the meta-data server 120 to flush all their dirty data in order to get an exact space usage of the file system thus far. Hereafter, the clients are not supposed to buffer any dirty data, so the space usage requirements can be resolved immediately. When the space usage reaches a pre-defined upper threshold or the quota of the file system, the meta-data server 120 can impose space allocation restrictions on the file system wherein reads and non-allocating writes are allowed.

In the object based storage environment of network 100, a file system can be created out of partitions inside the data servers 130-132, which are Object Storage Devices. It is noted that a partition is created where a file system allocates space from an object storage device (e.g., one of the data servers 130-132). In addition, the partition holds the objects for that file system. Furthermore, the total storage space usage of the file system is equal to the sum of the space usage of all the partitions of that file system across the data servers 130-132. Note that the current Object Storage Device standard defines a quota mechanism for the partition, which puts the upper limit on the space usage of the partition. In one embodiment, this "partition quota" can be used as the space allocation restriction to enforce a file system quota.

With reference to FIG. 1, in one embodiment, the meta-data server 120 periodically (e.g., every 5 seconds, 7 seconds, 10 seconds, or any time interval) polls all the object storage devices (or data servers 130-132) to figure out the space consumption of a file system's partitions. When the total space consumption becomes equal to a predefined quota for that file system, the meta-data server 120 can set the partition quota on each of the file system's partitions. In accordance with an embodiment, the partition quota can be set equal to the current storage space consumption of the partition. Thus, in any of the partitions, no more space allocation can be done. However, reads and overwrites continue to work since they do not involve space allocations.

Within networks 100 and 101, in one embodiment there are two ways of counting or accounting for storage space: "real space" and "effective usable space". For example, "real space" is the amount of physical storage space actually used on a data server or Object Storage Device (or in the case of free space, unused on the data server or Object Storage Device). In addition, "effective usable space" can be the amount of space used after taking RAID (redundant array of independent disks) overhead into account (or still available after taking RAID overhead into account). For example, if all the files on a file system are triple-mirrored, the real space consumed by the file system is three times the usable space (and the amount of usable free space is one-third the amount of real free space). In an embodiment, internal storage space usage by one or more other systems can be accounted for in addition to RAID overhead.

In accordance with an embodiment, when referring to space like stat( ) and statvfs( ) quota specification can use either real space or effective usable space. It is noted that an advantage of using real space is that administrators have better control of the physical space consumed by a file system. In addition, effective usable space is a rough estimation (e.g., usable free space is a projection based on current usage pattern). However, the effective usable space can be used for giving free space projections and may be as part of the stat( ) on an individual file.

It is noted that there are certain things that can enable the proper operation of network 100 of FIG. 1 and network 101 of FIG. 2. For example in one embodiment, each of networks 100 and 101 can include, but is not limited to, an interface to define file system quota; an interface to track file system space and quota usage; a mechanism to limit space usage of file system roughly within the quota limit; allowing "overwrites" even if the file system is running out of quota; space usage statistics reporting; estimation of effective or usable free space based on the current ratio between real and effective space; and support of space reservation for a file system.

In accordance with an embodiment of network 100 or network 101, at the time of file system creation or later, it can be assigned a quota which limits the amount of space that this file system can consume in a LUN (logical unit number) group or a group of computer storage. It is noted that in one embodiment, this support can depend on the ability of the data servers 130-132 to keep track of space usage by each partition. This can be provided by one embodiment on each of the data servers 130-132.

In one embodiment of network 100 or network 101, the module 299 can cause the meta-data server 120 to periodically (e.g., every 3 seconds, 5 seconds, 10 seconds, or any time interval) refresh the space usage data for each file system on the meta-data server 120 and keep track of the total current usage. The meta-data server 120 can monitor this and accordingly gives write tokens to the client 110. When the storage usage comes closer to the quota limit, clients (e.g., 110) are asked (e.g., lock revoke) to flush the buffered dirty data to the data servers 130-132 in order for the meta-data server 120 to get a more accurate idea of space usage by the file system. If the usage exceeds the quota limit, no write tokens are returned to the client 110. However, when or if the space usage comes below the quota limit (e.g., as indicated by the periodic refresh) the write tokens can again be issued to the client 110 by the meta-data server 120. In one embodiment, when the lock is revoked from the client 110, it is assumed that the client 110 will also discard the token. So when the client 110 next wants to write to the file it will ask for a new token.

In one embodiment of network 100 or network 101, there are different ways of implementing file system quota enforcement. For example, one of the ways can involve using write tokens. Specifically, when the file system reaches its quota limit, no more write tokens are issued to the clients (e.g., 110) by the meta-data server 120. The revoke of the write lock can result in the clients (e.g. 110) discarding the existing tokens. While the file system space usage is still not below its quota limit, "overwrite" tokens can be issued by the meta-data server 120. It is noted that this approach depends on the client 110 to honor the tokens and make sure that it just does overwrites and does not try to extend the file with the overwrite token.

Another way for implementing quota enforcement within networks 100 and 101 in accordance with one embodiment can involve using partition quota. Specifically, when the file system reaches its quota limit, the meta-data server 120 revokes all the write locks, which results in the client 110 flushing all the dirty data to the data servers 130-132. Now the meta-data server 120 is able to find out the space usage of all the partitions of this file system. The meta-data server 120 then sets partition quota equal to the current space usage of each partition of that file system. The setting of the partition quota ensures that no further allocation can be done in this file system, but overwrites and reads are allowed. In addition to setting partition quota, the client 110 should also convert their buffered writes to synchronized writes which ensures that the writes of the client 110 fail (if they need allocation) upfront if the file system is running out of quota.

In one embodiment of network 100 (FIG. 1) or network 101 (FIG. 2), when the first file system is mounted on a meta-data server (e.g., 120), the meta-data server 120 starts a quota daemon (which can be implemented by the module 299). The quota daemon 299 periodically (e.g., every 5 seconds, 10 seconds, or any time interval) checks the space usage of all the partitions of all the mounted file systems on that meta-data server 120. If the total space usage of a file system exceeds a threshold percentage (say 90%) of its quota limit, then the quota daemon 299 starts the hardening process for the file system. It is noted that the hardening process can be implemented in a wide variety of ways. For example, as part of the hardening process, the quota daemon 299 can, but is not limited to, revoke all the write locks issued for this file system, set "convert-to-sync" mode on the clients (e.g., 110), and change flag on the meta-data server mount to indicate that the file system has reached the quota limit. It is noted that in an embodiment, the get write object map operation checks the flag on the meta-data server mount to decide if the write tokens should be returned to the clients (e.g., 110). If the write tokens are requested for offsets within the file size, then they are considered overwrite tokens and are given to the clients (e.g., 110). In addition, the quota daemon 299 may also set appropriate partition quota to enforce the quota limit. Note that if the enforcement involves using the partition quota, then there may not be a need for the meta-data server 120 to block write tokens.

In accordance with an embodiment of network 100 or network 101, a file system reservation can be implemented by setting a common quota on all the file systems which do not have any set or established quota. The following is an example in accordance with one embodiment. For example, assume there are five file systems with the following quota/reservation/space usage:

| file system      | FS1 | FS2 | FS3 | FS4 | FS5 |
|------------------|-----|-----|-----|-----|-----|
| quota            | Q1  | Q2  |     |     |     |
| reservation      | R1  |     | R3  |     |     |
| space used so far| S1  | S2  | S3  | S4  | S5  |

Given that the total space (T) available for allocation is 90%, for example, of the actual space S in the system. The remaining 10% of space can be used as a buffer space to take care of pending client flushes. The remaining free space (Rem) can be defined as:

$$(Rem)=T-(S1+S2+S3+S4+S5)$$

Wherein the space needed "Sreq" to fulfill the reservation guarantees can be defined as:

$$(Sreq)=(R1-S1)+(R3-S3)$$

It is noted that if S1>R1 or S3>R3, then the respective deficit will be negative and will not be taken into consideration. Note that Sreq should not be greater than Rem. The above calculations can be performed on a routine basis. The frequency of repetition can define the amount of control of a file system space allocation. The following example pseudo code defines a calculation that can be used for file system reservation:

```
if (Sreq < Rem) {
        allow writes without question
} else {
    Stop allocations for file systems without any reservation OR
            whose space usage is >= their reservation
        in the above example,
                (FS2, FS4, FS5) : stop allocation for sure
                (FS1, FS3) : conditional (if S1 >= R1, S3 >= R3)
}
```

In one embodiment, at the time of setting the reservation for a file system, the above calculation is to be refreshed. The new reservation can be allowed if (Sreq<Rem) after considering the new reservation.

Figure 4:
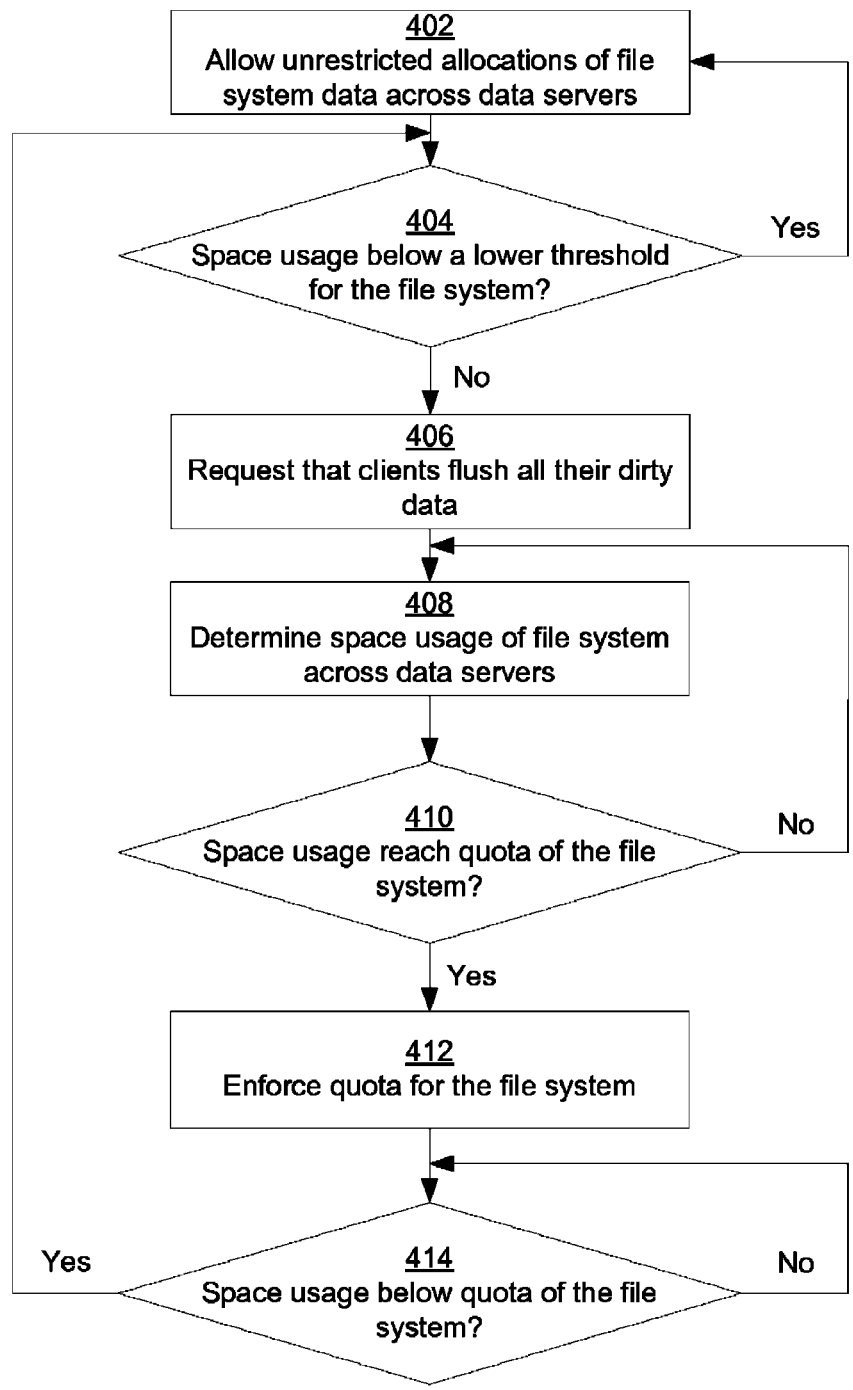
FIG. 4 is a flow diagram of a method in accordance with various embodiments of the present disclosure.

FIG. 4 is a flow diagram of an example method 400 in accordance with various embodiments of the present disclosure for implementing a file system quota. Although specific operations are disclosed in flow diagram 400, such operations are examples. Method 400 may not include all of the operations illustrated by FIG. 4. Also, method 400 may include various other operations and/or variations of the operations shown by FIG. 4. Likewise, the sequence of the operations of flow diagram 400 can be modified. It is appreciated that not all of the operations in flow diagram 400 may be performed. In various embodiments, one or more of the operations of method 400 can be controlled or managed by software, by firmware, by hardware or by any combination thereof, but is not limited to such. Method 400 can include processes of embodiments which can be controlled or managed by a processor(s) and electrical components under the control of computer or computing device readable and executable instructions (or code). The computer or computing device readable and executable instructions (or code) may reside, for example, in data storage features such as computer or computing device usable volatile memory, computer or computing device usable non-volatile memory, and/or computer or computing device usable mass data storage. However, the computer or computing device readable and executable instructions (or code) may reside in any type of computer or computing device readable medium.

Specifically, method 400 can include allowing unrestricted storage space allocations of data of a file system across one or more data servers (or Object Storage Devices). Additionally, a determination can be made as to whether the storage space usage of the file system is below or less than a lower threshold for the file system. If the storage space usage is below the lower threshold, process 400 can return to allowing of unrestricted space allocations of file system data across data servers (or Object Storage Devices). However, if the storage space usage is greater than the lower threshold, a meta-data server can request that clients flush all their dirty data. A determination can be made as to the storage space usage of the file system across the data servers (or Object Storage Devices). It is then determined whether the storage space usage has reached a quota of the file system. If not, process 400 can repeat the determination of the storage space usage of the file system across the data servers (or Object Storage Devices). However, if it is determined that the quota of storage usage has been reached, the quota can be enforced for the file system. It is determined whether the storage space usage of the file system has fallen below the quota. If not, that determination is performed repeatedly. However, if the storage space usage of the file system has fallen below the quota, process 400 can return to the determination of whether the storage space usage of the file system is below the lower threshold. In this manner, a file system quota can be implemented in accordance with various embodiments. It is noted that method 400 can be modified to implement multiple file system quotas for multiple file systems. For example in one embodiment, each of the file systems of a meta-data server having a corresponding file system quota can be handled in a manner similar to that described herein, but is not limited to such.

At operation 402 of FIG. 4, unrestricted storage space allocations of data of a file system are allowed across one or more data servers or Object Storage Devices (e.g., 130-132). It is pointed out that operation 402 can be implemented in a wide variety of ways. For example, operation 402 can be implemented in any manner similar to that described herein, but is not limited to such.

At operation 404, a determination can be made as to whether the storage space usage of the file system is below or less than a lower threshold for the file system. If the storage space usage is below the lower threshold at operation 404, process 400 can proceed to operation 402. However, if the storage space usage at operation 404 is beyond or above the lower threshold, process 400 can proceed to operation 406. It is noted that operation 404 can be implemented in a wide variety of ways. For example, operation 404 can be implemented in any manner similar to that described herein, but is not limited to such.

At operation 406 of FIG. 4, a meta-data server (e.g., 120) can request that clients (e.g., 110) flush all their dirty data to the data servers (e.g., 130-132) or Object Storage Devices. Note that operation 406 can be implemented in a wide variety of ways. For example, operation 406 can be implemented in any manner similar to that described herein, but is not limited to such.

At operation 408, a determination can be made as to the storage space usage of the file system across the data servers (or Object Storage Devices). It is pointed out that operation 408 can be implemented in a wide variety of ways. For example, operation 408 can be implemented in any manner similar to that described herein, but is not limited to such.

At operation 410 of FIG. 4, it is determined whether the storage space usage has reached a quota of the file system. If not, process 400 can proceed to operation 408. However, if it is determined at operation 410 that the quota of storage usage has been reached, process 400 can proceed to operation 412. It is noted that operation 410 can be implemented in a wide variety of ways. For example, operation 410 can be implemented in any manner similar to that described herein, but is not limited to such.

At operation 412, the quota can be enforced for the file system. Note that operation 412 can be implemented in a wide variety of ways. For example, operation 412 can be implemented in any manner similar to that described herein, but is not limited to such.

At operation 414 of FIG. 4, it is determined whether the storage space usage of the file system has fallen below the quota. If not, process 400 can proceed to repeat operation 414. However, if the storage space usage of the file system has fallen below the quota at operation 414, process 400 can proceed to operation 404. It is noted that operation 414 can be implemented in a wide variety of ways. For example, operation 414 can be implemented in any manner similar to that described herein, but is not limited to such. In this fashion, a file system quota can be implemented in accordance with various embodiments.

Figure 5:
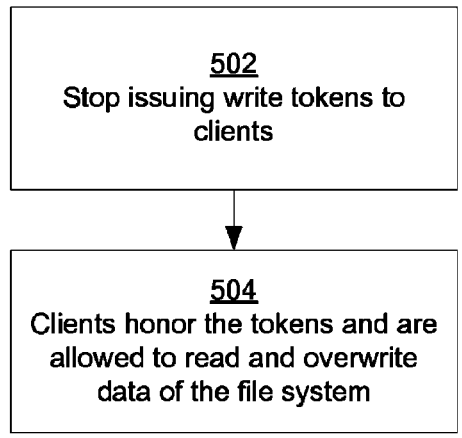
FIG. 5 is a flow diagram of another method in accordance with various embodiments of the present disclosure.

FIG. 5 is a flow diagram of an example method 500 in accordance with various embodiments of the present disclosure for enforcing a quota for a file system. Although specific operations are disclosed in flow diagram 500, such operations are examples. Method 500 may not include all of the operations illustrated by FIG. 5. Also, method 500 may include various other operations and/or variations of the operations shown by FIG. 5. Likewise, the sequence of the operations of flow diagram 500 can be modified. It is appreciated that not all of the operations in flow diagram 500 may be performed. In various embodiments, one or more of the operations of method 500 can be controlled or managed by software, by firmware, by hardware or by any combination thereof, but is not limited to such. Method 500 can include processes of embodiments which can be controlled or managed by a processor(s) and electrical components under the control of computer or computing device readable and executable instructions (or code). The computer or computing device readable and executable instructions (or code) may reside, for example, in data storage features such as computer or computing device usable volatile memory, computer or computing device usable non-volatile memory, and/or computer or computing device usable mass data storage. However, the computer or computing device readable and executable instructions (or code) may reside in any type of computer or computing device readable medium.

Specifically, method 500 can include a meta-data server stopping the issuing of write tokens to clients. Furthermore, the clients honor the tokens issued by the meta-data server and are allowed to read and overwrite data of the file system. In this manner, a file system quota can be enforced in accordance with various embodiments.

At operation 502 of FIG. 5, a meta-data server (e.g., 120) can stop issuing write tokens to clients (e.g., 110). It is pointed out that operation 502 can be implemented in a wide variety of ways. For example, operation 502 can be implemented in any manner similar to that described herein, but is not limited to such.

At operation 504, the clients (e.g., 110) honor the tokens issued by the meta-data server (e.g., 120) and are allowed to read and overwrite data of the file system. It is noted that operation 504 can be implemented in a wide variety of ways. For example, operation 504 can be implemented in any manner similar to that described herein, but is not limited to such. In this manner, a file system quota can be enforced in accordance with various embodiments.

Figure 6:
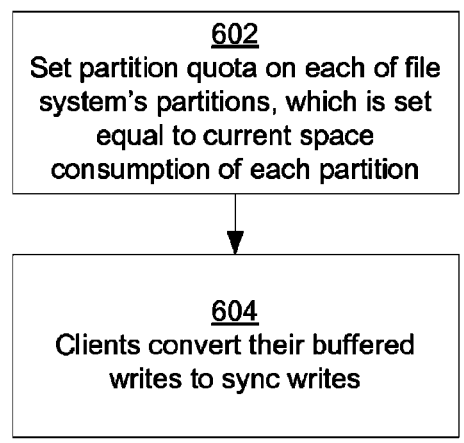
FIG. 6 is a flow diagram of yet another method in accordance with various embodiments of the present disclosure.

FIG. 6 is a flow diagram of an example method 600 in accordance with various embodiments of the present disclosure for enforcing a quota for a file system. Although specific operations are disclosed in flow diagram 600, such operations are examples. Method 600 may not include all of the operations illustrated by FIG. 6. Also, method 600 may include various other operations and/or variations of the operations shown by FIG. 6. Likewise, the sequence of the operations of flow diagram 600 can be modified. It is appreciated that not all of the operations in flow diagram 600 may be performed. In various embodiments, one or more of the operations of method 600 can be controlled or managed by software, by firmware, by hardware or by any combination thereof, but is not limited to such. Method 600 can include processes of embodiments which can be controlled or managed by a processor(s) and electrical components under the control of computer or computing device readable and executable instructions (or code). The computer or computing device readable and executable instructions (or code) may reside, for example, in data storage features such as computer or computing device usable volatile memory, computer or computing device usable non-volatile memory, and/or computer or computing device usable mass data storage. However, the computer or computing device readable and executable instructions (or code) may reside in any type of computer or computing device readable medium.

Specifically, method 600 can include a meta-data server setting partition quota on each of the file system's partitions, which is set equal to current space consumption of each partition. In addition, clients convert their buffered writes to synchronized writes. In this manner, a file system quota can be enforced in accordance with various embodiments.

At operation 602 of FIG. 6, a meta-data server (e.g., 120) sets partition quota on each of the file system's partitions, which is set equal to current space consumption of each partition. It is pointed out that operation 602 can be implemented in a wide variety of ways. For example, operation 602 can be implemented in any manner similar to that described herein, but is not limited to such.

At operation 604, the clients (e.g., 110) convert their buffered writes to synchronized writes. It is noted that operation 604 can be implemented in a wide variety of ways. For example, operation 604 can be implemented in any manner similar to that described herein, but is not limited to such. In this manner, a file system quota can be enforced in accordance with various embodiments.

Figure 7:
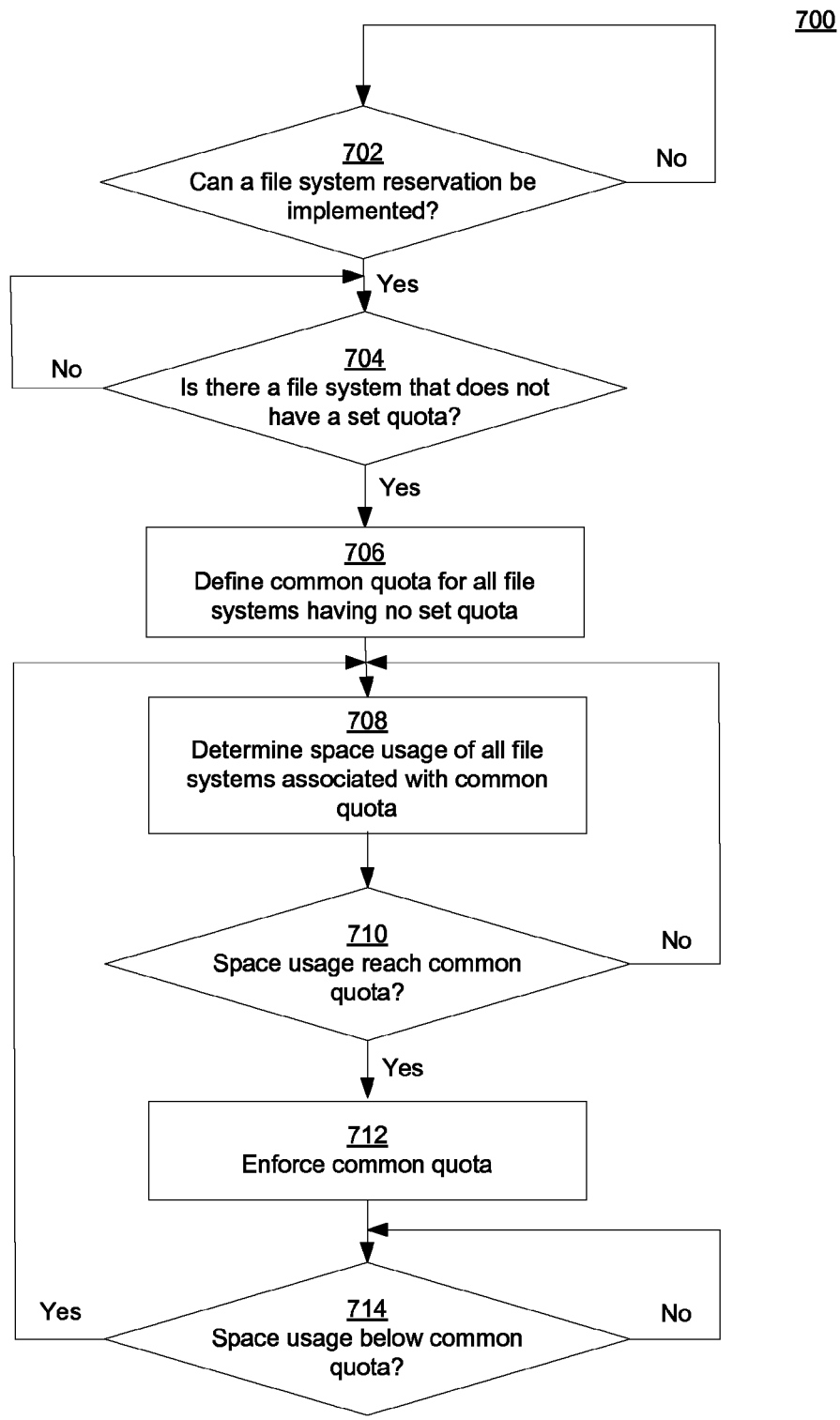
FIG. 7 is a flow diagram of still another method in accordance with various embodiments of the present disclosure.

FIG. 7 is a flow diagram of an example method 700 in accordance with various embodiments of the present disclosure for implementing file system reservation. Although specific operations are disclosed in flow diagram 700, such operations are examples. Method 700 may not include all of the operations illustrated by FIG. 7. Also, method 700 may include various other operations and/or variations of the operations shown by FIG. 7. Likewise, the sequence of the operations of flow diagram 700 can be modified. It is appreciated that not all of the operations in flow diagram 700 may be performed. In various embodiments, one or more of the operations of method 700 can be controlled or managed by software, by firmware, by hardware or by any combination thereof, but is not limited to such. Method 700 can include processes of embodiments which can be controlled or managed by a processor(s) and electrical components under the control of computer or computing device readable and executable instructions (or code). The computer or computing device readable and executable instructions (or code) may reside, for example, in data storage features such as computer or computing device usable volatile memory, computer or computing device usable non-volatile memory, and/or computer or computing device usable mass data storage. However, the computer or computing device readable and executable instructions (or code) may reside in any type of computer or computing device readable medium.

Specifically, method 700 can include determining whether a file system reservation can be implemented within a system. If not, process 700 can repeatedly perform that determination. However, if a file system can be implemented, a determination is made as to whether there are one or more file systems that do not have a set or established quota. If not, process 700 can repeatedly perform that determination. However, if there is one or more file systems that do not have a set quota, a common quota is defined for all of the file systems that have no set quota. A determination can be made as to the storage space usage of all of the file systems associated with the common quota across the data servers (or Object Storage Devices). It is determined whether the storage space usage has reached the common quota. If not, process 700 can proceed to repeat the determination of the storage space usage. However, if the storage space usage has reached the common quota, the common quota can be enforced against those file systems associated with it. In addition, it is determined whether the storage space usage of the file systems associated with the common quota has fallen below the common quota. If not, that determination is performed repeatedly. However, if the storage space usage of the file systems associated with the common quota has fallen below the common quota, process 700 can return to the determination of the storage space usage of all of the file systems associated with the common quota across the data servers (or Object Storage Devices). In this manner, a file system reservation can be implemented in accordance with various embodiments.

At operation 702 of FIG. 7, a determination can be made as to whether a file system reservation can be implemented within a system (e.g., network 100 or network 101). If not, process 700 can proceed to repeat operation 702. However, if a file system can be implemented at operation 702, process 700 can proceed to operation 704. It is pointed out that operation 702 can be implemented in a wide variety of ways. For example, operation 702 can be implemented in any manner similar to that described herein, but is not limited to such.

At operation 704, a determination can be made as to whether there is one or more file systems that do not have a set or established quota. If not, process 700 can proceed to repeat operation 704. However, if there is one or more file system that do not have a set quota at operation 704, process 700 can proceed to operation 706. It is noted that operation 704 can be implemented in a wide variety of ways. For example, operation 704 can be implemented in any manner similar to that described herein, but is not limited to such.

At operation 706 of FIG. 7, a common quota can be defined for all of the file systems that have no set quota. Note that operation 706 can be implemented in a wide variety of ways. For example, operation 706 can be implemented in any manner similar to that described herein, but is not limited to such.

At operation 708, a determination can be made as to the storage space usage of all of the file systems associated with the common quota across the data servers or Object Storage Devices (e.g., 130-132). It is pointed out that operation 708 can be implemented in a wide variety of ways. For example, operation 708 can be implemented in any manner similar to that described herein, but is not limited to such.

At operation 710 of FIG. 7, it can be determined whether the storage space usage has reached the common quota. If not, process 700 can proceed to operation 708. However, if the storage space usage has reached the common quota at operation 710, process 700 can proceed to operation 712. It is noted that operation 710 can be implemented in a wide variety of ways. For example, operation 710 can be implemented in any manner similar to that described herein, but is not limited to such.

At operation 712, the common quota can be enforced against those file systems associated with it. Note that operation 712 can be implemented in a wide variety of ways. For example, operation 712 can be implemented in any manner similar to that described herein, but is not limited to such.

At operation 714 of FIG. 7, it can be determined whether the storage space usage of the file systems associated with the common quota has fallen below the common quota. If not, process 700 can proceed to repeat operation 714. However, if the storage space usage of the file systems associated with the common quota has fallen below the common quota, process 700 can proceed to operation 708. It is noted that operation 714 can be implemented in a wide variety of ways. For example, operation 714 can be implemented in any manner similar to that described herein, but is not limited to such. In this fashion, a file system reservation can be implemented in accordance with various embodiments.

Figure 8:
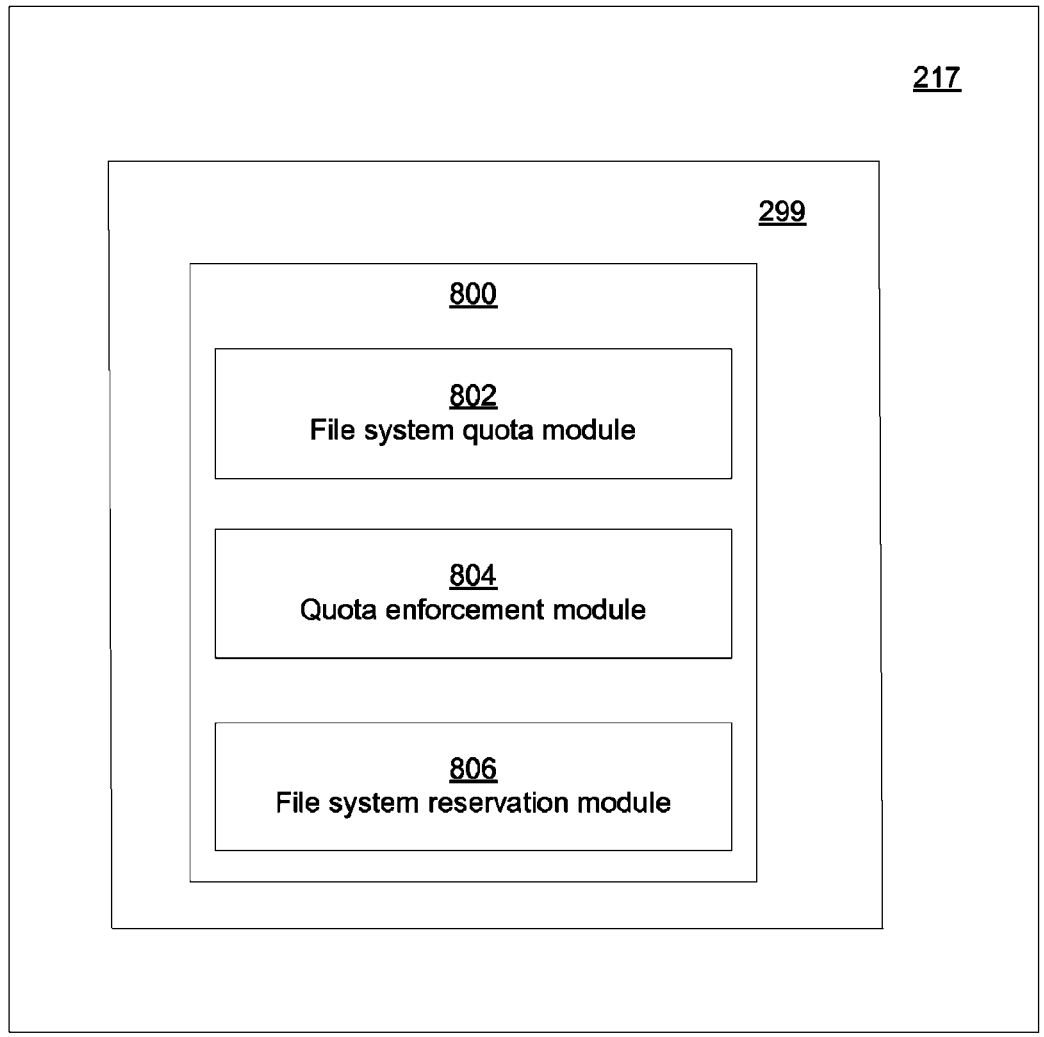
FIG. 8 is a block diagram of modules in accordance with various embodiments of the present disclosure.

FIG. 8 is a block diagram of an example module 800 in accordance with one embodiment of the present disclosure. In an embodiment, the module 800 can include instructions stored on a computer readable medium. In addition, the module 800 can be part of the module 299 (described herein), which can be stored within the system memory 217. The module 800 can include, but is not limited to, a file system quota module 802, a quota enforcement module 804, and a file system reservation module 806.

Specifically, the file system quota module 802 can include instructions for performing a file system quota method (e.g., method 400, and the like). In addition, the quota enforcement module 804 can include instructions for performing a quota enforcement method (e.g., method 500, method 600, and the like). Furthermore, the file system reservation module 806 can include instructions for performing a file system reservation method (e.g., method 700, and the like). It is appreciated that the file system quota module 802, the quota enforcement module 804, and the file system reservation module 806 can be implemented as part of a variety of environments. For example, the file system quota module 802, the quota enforcement module 804, and the file system reservation module 806 can be implemented as part of a distributed computing environment, a cloud computing environment, a client server environment, etc.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

What is claimed is:

1. A method comprising:
managing storage allocation of data of a file system within an object based storage system;
determining whether storage allocation usage for the file system is below a first threshold;
permitting unrestricted allocation of the data of the file system within the object based storage system when it is determined that the storage allocation used for the file system is below the first threshold;
transmitting a request to a client to flush its dirty data associated with the file system to a server when it is determined that the storage allocation usage for the file system exceeds the first threshold;
after requesting the client flush, determining the storage allocation usage for the file system;
determining periodically whether the storage allocation usage has reached a quota, the quota being associated with a second threshold; and
enforcing the quota for the data of the file system when it is determined that the quota has been reached.

2. The method of claim 1, further comprising:
after the enforcing of the quota, determining whether the storage allocation usage for the file system is below the quota.

3. The method of claim 1, wherein the enforcing comprises stopping issuance of write tokens for the file system.

4. The method of claim 1, wherein the enforcing comprises setting a partition quota on a partition of the file system.

5. The method of claim 4, wherein the setting the partition quota on the partition comprises setting the partition quota equal to a storage consumption of the partition.

6. The method of claim 1, wherein managing of the permissions of the storage allocation further comprises permitting storage allocation of data of the file system across a plurality of data servers within the object based storage system.

7. The method of claim 1, wherein the quota is a common quota for a plurality of file systems.

8. A non-transitory computer readable storage medium having stored thereon, computer-executable instructions that when executed by a computing device cause the computing device to perform a method, the method comprising:
managing storage allocation of data of a file system within an object based storage system;
determining whether storage allocation usage for the file system is below a first threshold;
permitting unrestricted allocation of the data of the file system within the object based storage system when it is determined that the storage allocation used for the file system is below the first threshold;
transmitting a request to a client to flush its dirty data associated with the file system to a server when it is determined that the storage allocation usage for the file system exceeds the first threshold;
after requesting the client flush, determining the storage allocation usage for the file system;
determining periodically whether the storage allocation usage has reached a quota, the quota being associated with a second threshold; and
enforcing the quota for the data of the file system when it is determined that the quota has been reached.

9. The non-transitory computer readable medium of claim 8, the method further comprising:
after the enforcing of the quota, determining whether the storage allocation usage for the file system is below the quota.

10. The non-transitory computer readable medium of claim 8, wherein the enforcing comprises stopping issuance of write tokens for the file system.

11. The non-transitory computer readable medium of claim 8, wherein the enforcing comprises setting a partition quota on a partition of the file system.

12. The non-transitory computer readable medium of claim 11, wherein the setting the partition quota on a partition comprises setting the partition quota equal to a storage consumption of the partition.

13. The non-transitory computer readable medium of claim 8, wherein the managing permissions of storage allocation further comprises permitting storage allocation of data of the file system across a plurality of data servers within the object based storage system.

14. The non-transitory computer readable medium of claim 8, wherein the quota is a common quota for a plurality of file systems.

15. A computer system comprising:
a processor; and
computer readable storage media coupled to the processor and having stored therein instructions that, when executed by the computer system cause the computer system to execute a method, the method comprising:
managing storage allocation of data of a file system within an object based storage system;
determining whether storage allocation usage for the file system is below a first threshold;
permitting unrestricted allocation of the data of the file system within the object based storage system when it is determined that the storage allocation used for the file system is below the first threshold;
transmitting a request to a client to flush its dirty data associated with the file system to a server when it is determined that the storage allocation usage for the file system exceeds the first threshold;

after requesting the client flush, determining the storage allocation usage for the file system;

determining periodically whether the storage allocation usage has reached a quota, the quota being associated with a second threshold; and enforcing the quota for the data of the file system when it is determined that the quota has been reached.

16. The computer system of claim 15, wherein the method further comprising:

after the enforcing of the quota, determining whether the storage allocation usage for the file system is below the quota.

17. The computer system of claim 15, wherein the enforcing comprises stopping issuance of write tokens for the file system.

18. The computer system of claim 15, wherein the enforcing comprises setting a partition quota on a partition of the file system.

19. The computer system of claim 18, wherein setting the partition quota on the partition comprises setting the partition quota equal to a storage consumption of the partition.

20. The computer system of claim 15, wherein the quota is a common quota for a plurality of file systems.

* * * * *